United States Patent [19]

Weyh

[11] Patent Number: 4,787,815
[45] Date of Patent: Nov. 29, 1988

[54] WICKET GATE MOUNTING WITH ADJUSTABLE PLAY FOR WATER TURBINES

[75] Inventor: Otto Weyh, Zang, Fed. Rep. of Germany

[73] Assignee: J. M. Voith GmbH, Fed. Rep. of Germany

[21] Appl. No.: 106,512

[22] Filed: Oct. 8, 1987

[30] Foreign Application Priority Data

Oct. 16, 1986 [DE] Fed. Rep. of Germany ....... 3635203

[51] Int. Cl.⁴ .................. F04D 29/48; F16C 23/02
[52] U.S. Cl. .................................. 415/164; 415/126; 384/271; 384/626
[58] Field of Search ............... 415/160, 161, 162, 163, 415/164, 151, 170 R, 126, 131, 132, 171; 277/267, 271, 272, 273, 626

[56] References Cited

U.S. PATENT DOCUMENTS

| 349,361 | 9/1886 | Roots | 384/272 |
| 2,124,866 | 7/1938 | Young | 384/626 |
| 2,930,579 | 3/1960 | Boyd et al. | 415/160 |
| 3,915,517 | 10/1975 | Orefice | 384/271 |
| 4,277,221 | 7/1981 | Kanger | 415/160 |

FOREIGN PATENT DOCUMENTS

| 3501731 | 7/1986 | Fed. Rep. of Germany . |
| 696140 | 8/1953 | United Kingdom | 384/271 |

OTHER PUBLICATIONS

Von J. Hilgendorf, K. Oettle, H. Fichtenbauer and G. Fischer, "Die Pumpenturbine Rodund II", Voith Forschung und Konstruction, Heft 27(1981), Aufsatz 1, Sonderdruck t2428, pp. 1.1 through 1.11.

Primary Examiner—Robert E. Garrett
Assistant Examiner—Joseph M. Pitko
Attorney, Agent, or Firm—Ostrolenk, Faber, Gerb & Soffen

[57] ABSTRACT

A wicket gate mounting for the individual wicket gates of a water turbine includes a respective bottom stem for the wicket gate. The mounting includes a conically tapered inner bore of an outer bushing and a cooperating, complementary, conically tapered outer surface of an inner bushing. The inner bushing is longitudinally slit. The inner bushing is connected to a ring disposed at one end which has an axial surface facing toward an axial surface on the end of the outer bushing. Between the axially facing surfaces at the ends of the inner and outer bushings is disposed an axially adjustable alignment ring for adjusting the axial positions of the inner and outer bushings with respect to each other which adjusts the bearing play between a layer of slide bearing material inside the inner bushing and the wicket gate stem. The axial thickness of the alignment ring is adjusted, e.g. by being reduced in thickness so that the inner bushing is pressed further into the stationary outer bushing. The outer and inner bushings with the alignment ring in place are fastened together.

13 Claims, 1 Drawing Sheet

WICKET GATE MOUNTING WITH ADJUSTABLE PLAY FOR WATER TURBINES

BACKGROUND OF THE INVENTION

The present invention relates to a wicket gate mounting with adjustable play, particularly for water turbines.

A turbine includes wicket gates which are arranged around a turbine axis. Wicket gates are also sometimes referred to as guide vanes. The orientation of each wicket gate around a respective axis parallel to and radially outward of the turbine axis is to be adjusted, and a respective wicket gate stem supports the wicket gate at the respective axis.

Wicket gate stems are mounted using maintenance-free slide bearings which do not require any grease or oil lubrication. The slide bearing uses a layer of slide material, consisting substantially of polytetrafluoroethylene. The layer can be produced only with relatively large tolerances, leading to unfavorable conditions of bearing play. Furthermore, under certain operating conditions, particularly for pump turbines, brief rotational and flexural vibrations of the wicket gates occur. When these are increased by excessive bearing play in addition to the normal wear, it results in increasing wear of the layer of slide material. This is discussed in Publication No. t 2428 distributed by J. M. Voith, GmbH, assignee hereof.

Federal Republic of Germany DE-OS No. 35 01 731 describes a radial slide bearing of the aforementioned type in which an outer bushing has a circular cylindrical inner bore. Within that bore, an inner multipartite bushing is seated in both radially and axially immovable fashion. A layer of slide bearing material is attached to the inner bushing only in individual sections distributed over the circumference of the bearing. The layer of material in the remaining circumferential region can be lifted off from the inner bushing by the action of a hydraulic pressure fluid introduced between the layer and the bushing. In this way, this bearing can be adjusted free of radial play.

This, however, requires a suitably developed, failproof supply of pressure fluid. Furthermore, the escape of fluid from the space between the inner bushing and the layer of slide bearing material must be avoided. The presupposes an effective sealing of the individual parts of the inner bushing with respect to each other and with respect to the layer of slide bearing material. Viewed as a whole, this known bearing embodiment is very expensive, and it is not completely dependable in operation.

SUMMARY OF THE INVENTION

The object of the present invention is to provide a wicket gate mounting which is dependable in operation and the bearing play of which can be adjusted mechanically in a simple manner.

In a turbine, particularly a water turbine and more particularly a pump turbine, individual wicket gates are supported in a toroidal chamber. Each is individually adjustable in its orientation in the chamber around a respective wicket gate stem axis that is parallel to the axis of the turbine for adjusting the inclination of the wicket gate in the toroidal chamber and the extent to which the cross-section of the chamber is filled by the wicket gates. The respect stem axis about which each wicket gate is pivotable is located outside the toroidal chamber. Each wicket gate stem is supported inside concentric, radially fixed bushings. The wicket gate stem is mounted inside the inner one of the concentric bushings and is supported there by a layer of slide bearing material between the bushing and the stem.

According to the invention, the outermost bushing is fixedly positioned and non-rotatable. It has a conically tapering inner bore which widens in the direction away from the connection between the stem and the wicket gate. The concentric inner bushing is disposed inside the inner bore of the outer bushing. The inner bushing is adjustable axially with respect to the outer bushing. The inner bushing has an inner bore in which the wicket gate stem is supported. The inner bushing has a conically tapered outer surface which cooperates with the conically tapered inner bore surface of the outer bushing.

Means on the outer and inner bushings cooperate so as to define a space between those means in the axial direction, and adjustment of the axial length of that space adjusts the axial positions of the bushings which adjusts the radial distance between the complementary, tapering surfaces of the outer and inner bushings, which adjusts the play in the wicket gate stem.

There is inserted in the axial space between the means of the outer and inner bushings an alignment ring or rings of adjustable thickness which determines the relative axial positions of the outer and inner bushings.

Preferably, the inner bushing is longitudinally slit which permits the desired play.

The means on the inner bushing, which cooperates with the outer bushing for defining an axial space between them comprises a ring supported at one end of the inner bushing, and preferably the end of the inner bushing having the wider diameter of the outer surface. The ring faces the adjacent wider diameter end of the outer bushing or particularly a ring provided at that end of the outer bushing. An alignment ring or alignment rings for adjusting the relative axial positions of the bushings is disposed between those two rings on the bushings. The outer bushing, the inner bushing and the alignment rings are all connected together by attachable connection means.

In one preferred form, the alignment ring is a single piece machined to a desired thickness. In another preferred form, it may comprise a series of annular disks, and its thickness is determined by the number of disks used, that is, by removal of one or more annular disks.

This solution is advantageous because adjusting or readjusting of the bearing play requires merely modifying the thickness of the alignment ring, i.e. reducing it. Upon the assembly of the ring of the inner bushing and the alignment ring with the fixed outer bushing, the slit inner bushing is pressed deeper into the inner bore of the outer bushing and its inside diameter is thus reduced. This leads to a correspondingly precisely measurable reduction in bearing play. An undesired change in the adjusted bearing play by axial displacement inner bushing in the fixed outer bushing is avoided.

Other objects and features of the invention are explained below with reference to the drawings.

DESCRIPTION OF THE PREFERRED EMBODIMENT

Figure 1:
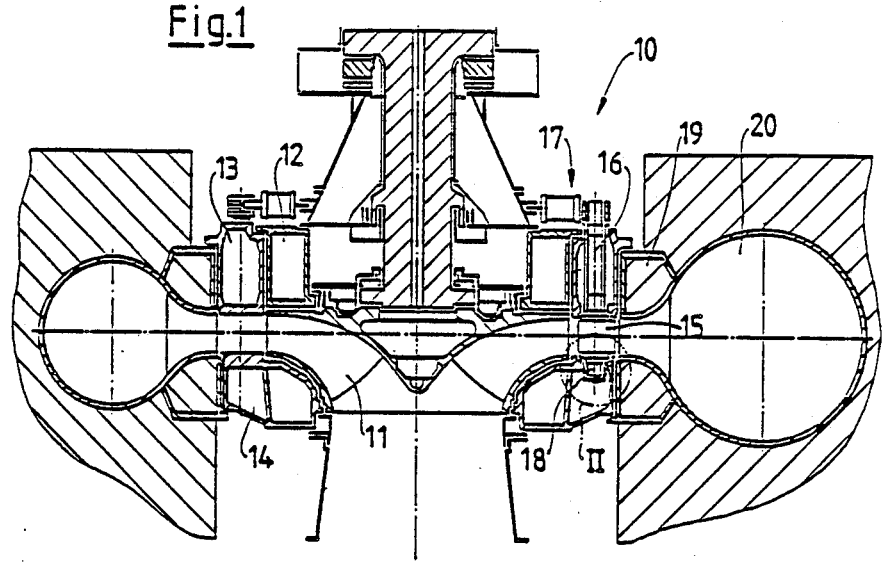
FIG. 1 is a cross section through a pump turbine.

A pump turbine 10 has an impeller 11 with a vertical axis. It is limited on top by an inner turbine cover 12. Adjacent the inner cover 12, there is an outer turbine cover 13. On the other bottom side of the impeller 11, a bottom ring 14 lies opposite the turbine cover 12, 13. In the circumferential region of the impeller 11, there are a plurality of wicket gates 15 which are arranged a uniform distance apart. Each wicket gate 15 has a top stem 16 that is double supported in the outer turbine cover 13. Above the outer turbine cover 13, the wicket gate top stems 16 are connected to distributor 17 which is used for effecting vane displacement. Each wicket gate 15 is mounted by a wicket gate bottom stem 18 in the bottom ring 14. A stay ring 19, which passes into a spiral casing 20, is radially outside and adjoins the outer turbine cover 13 as well as the bottom ring 14.

Figure 2:
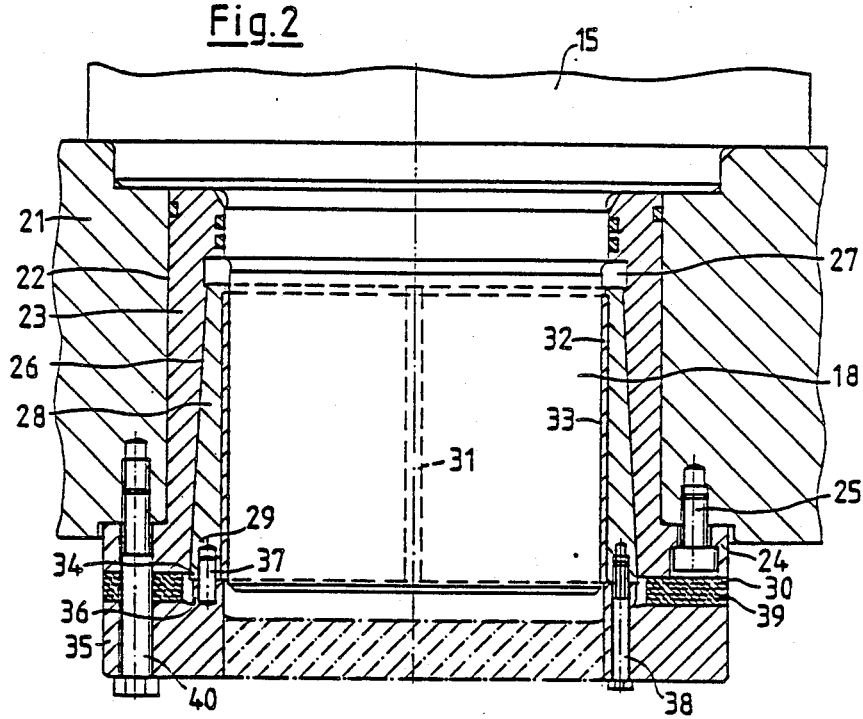
FIG. 2 shows, as detail II of FIG. 1, a wicket gate mounting of the invention on a larger scale.

The mounting of a wicket gate 15 is shown in FIG. 2. It is mounted on a respective wicket gate bottom stem 18. Such a mounting can, however, also be used in the region of the wicket gate top stem 16.

A cylindrical bore 22 is defined in a wall 21 of the bottom ring 14. The wicket gate bottom stem 18 passes through the bore 22. An outer bushing 23 is fitted in the bore 22. In its region facing away from the bottom ring 14, the outer bushing 23 has a flange 24 which rests against the wall 21 and is attached to it by screws 25. Outer bushing 23 is fixed there against any movement. The fixed outer bushing 23 is provided with a conical inner bore 26 which widens toward the flange 24, away from wicket gate 15 and downward in FIG. 2. In the direction toward the wicket gate 15, the inner bore 26 passes into a recess 27.

Within the inner bore 26 of the outer bushing 23, there is fitted an inner bushing 28, which has an outer surface with a complementary taper to the outer bushing. The inner bushing 28 extends over the entire length of the conical inner bore 26 of the outer bushing 23. On the wicket gate side, the inner bushing 23 terminates at the recess 27. The end section 29 of inner bushing 23, which is the end away from the wicket gate 15, extends beyond the free axially downwardly directed face 30 of the flange 24 of the outer bushing 23.

The inner bushing 28 has a longitudinal slit 31 in order to maintain good bearing contact with the desirable amount of play. The bottom stem 18 of the wicket gate 15 passes through the bushing 28 over the entire length of the bushing 28.

There is a third thin walled bushing 32 surrounded by the inner bushing 28. On its inner side, bushing 32 carries a layer 33 of slide-bearing material for the mounting of the wicket gate bottom stem 18. The bushing 32 extends over practically the entire axial length of the inner bushing 28. Bushing 32 is also slit longitudinally.

The end section 29 of the inner bushing 28 is of larger diameter and faces away from the wicket gate. Against the end 34 of end section 29, there is supported a ring 35, which engages over the nearby lower face 30 of the outer bushing 23. The ring 35 is supported by a hollow cylindrical extension 36 at the interior of the ring 35. Between the face 30 of the outer bushing 23 and the ring 35 there remains an axial space, which corresponds to the axial length of the recess 27. As indicated by dot-dash lines in FIG. 2, the ring 35 can also be developed as closed cover, since the wicket gate bottom stem 18 terminates directly behind the inner bushing 28. The inner bushing 28 and the ring 35 are connected to each other by pins 37 and fastening screws 38.

An alignment ring 39 of reducible thickness is inserted in the axial space between the downwardly facing face 30 of the ring 35. Ring 39 rests simultaneously against the said two structural parts. The alignment ring 39 can, as shown, be developed in a single piece or it may, as indicated by dot-dash parallel lines, comprise annular disks which rest aligned on top of each other. The ring 35, the alignment ring 39 and the outer bushing 23 are detachably connected to each other by a plurality of screws 40 which are distributed uniformly over the circumference of these structural parts and engage into the wall 21 of the bottom ring 14.

For adjusting and readjusting the bearing play between the wicket gate bottom stem 18 and the layer 33 of slide bearing material, the screws 40 and 38 are removed. Then the ring 35 and the alignment ring 39 are removed. With due consideration for the taper of the inner bore 26 of the bushing 23 and the bearing play to be obtained, the one piece alignment ring 39 is adjusted in its thickness by machining. With the use of thin annular disks, which rest on top of each other, instead of the one piece alignment ring 39, the stack of disks can be adapted in height in a corresponding manner by omitting one or more of the annular disks. Upon the mounting of the ring 35 and of the alignment ring 39 or the annular disks which has been adapted in thickness, the inner bushing 28 together with the bushing 32, which carries the layer 33 of slide-bearing material, is pressed deeper into the fixed outer bushing 23 upon the tightening of the screws 40. This reduces the diameter of the inner bushing 28 and thus also reduces the bearing play between the wicket gate bottom stem 18 and the layer 33 of slide-bearing material. An undesired change in this bearing play during the operation of the pump turbine 10, as a result of axial travel of the inner bushing 28 in the outer bushing 23, is made impossible by the form-locked and force-locked connection of the ring 35 to the inner bushing 28.

Although the present invention has been described in connection with a preferred embodiment thereof, many variations will now become apparent to those skilled in the art. It is preferred, therefore, that the present invention be limited not by the specific disclosure herein, but only by the appended claims.

What is claimed is:

1. A wicket gate mounting for the wicket gate of a turbine, wherein the turbine includes an array of wicket gates arranged around a central axis, and each wicket gate is also supported on a respective wicket gate axis radially outward of the central axis, and the wicket gate having a wicket gate stem and the wicket gate being individually rotatable about its respective wicket gate stem at the respective axis;

the wicket gate mounting at each respective axis comprising a non-rotating outer bushing, a concentric inner bushing disposed inside the outer bushing and a stem for the wicket gate, the wicket gate stem being disposed inside and being relatively rotatable with respect to the inner bushing;

the outer bushing having an inner bore in which the inner bushing is located, the inner bore of the outer bushing being conically tapered, with the inner bore having a radially wider end and a radially narrower end;

the inner bushing disposed within the inner bore of the outer bushing having an outer surface which is conically tapered complementary to the taper of the inner bore of the outer bushing, the inner bushing being axially adjustable in position along the outer bushing, which adjusts the radial bearing play between the inner bore of he inner bushing and the outer surface of the wicket gate stem;

respective means on the inner and outer bushings which are adjustably spaceable apart axially corresponding to the axial adjustments in position between the outer and inner bushings;

and adjustment means at the means between the outer and inner bushings for holding the axial spacing between the outer and inner bushings at a selected dimension;

wherein the adjustment means comprises a ring that is attached to the inner bushing, that projects radially outwardly and that includes an axially directed surface, and the outer bushing includes a cooperating axially facing surface directed toward the axially facing surface of the inner bushing, and a spacer disposed between those cooperating axially facing surfaces; and wherein the ring is separate from the inner busing; the mounting further comprising means for detachably connecting the ring which is connected to the inner bushing, the alignment ring and the outer bushing together.

2. The wicket gate mounting of claim 1 wherein the outer bushing includes an outwardly directed flange portion on which the axially facing surface thereof is formed.

3. The wicket gate mounting of claim 1 wherein the spacer comprises an alignment ring of adjustable thickness.

4. The wicket gate mounting of claim 3 wherein the alignment ring comprises a plurality of annular disks stacked in alignment one above the other and the axial height of the alignment ring is determined by the number of annular disks.

5. The wicket gate mounting of claim 1 wherein the inner bushing has opposite ends at which the outer surface thereof is of smaller diameter and larger diameter, respectively; the adjustably spaceable means on the inner bushing being at the end thereof where the outer surface has greater diameter.

6. The wicket gate mounting of claim 5, wherein the wicket gate stem communicates with the wicket gate from the axial side of the wicket gate mounting at which the inner bore of the outer bushing is of smaller diameter.

7. The wicket gate mounting of claim 1 wherein the adjustment means comprises an alignment ring of adjustable thickness disposed in the space between the outer and inner bushings.

8. The wicket gate mounting of claim 7 wherein the alignment ring comprises a plurality of annular disks stacked in alignment one above the other and the axial height of the space between the inner and outer bushings being determined by the number of the annular disks.

9. The wicket gate mounting of claim 7, further comprising means for detachably connecting the outer bushing, the alignment ring and the inner bushing together.

10. The wicket gate mounting of claim 1, wherein the inner bushing is longitudinally divided by being longitudinally slit.

11. The wicket gate mounting of claim 1, further comprising an additional slide bushing with a layer of sliding material disposed between the stem and the interior of the inner bushing for enabling rotation of the wicket gate stem with respect to the inner bushing.

12. The wicket gate mounting of claim 1, further comprising pins extending between and bolts joining the ring projecting from the inner bushing and the inner bushing for holding them against relative shifting.

13. A wicket gate mounting for the wicket gate of a turbine, wherein the turbine includes an array of wicket gates arranged around a central axis, and each wicket gate is also supported on a respective wicket gate axis radially outward of the central axis, and the wicket gate having a wicket gate stem and the wicket gate being individually rotatable about its respective wicket gate stem at the respective axis;

the wicket gate mounting at each respective axis comprising a non-rotating outer bushing, a concentric inner bushing disposed inside the outer bushing and a stem for the wicket gate, the wicket gate stem being disposed inside and being relatively rotatable with respect to the inner bushing;

the outer bushing having an inner bore in which the inner bushing is located, the inner bore of the outer bushing being conically tapered, with the inner bore having a radially wider end and a radially narrower end;

the inner bushing disposed within the inner bore of the outer bushing having an outer surface which is conically tapered complementary to the taper of the inner bore of the outer bushing, the inner bushing being axially adjustable in position along the outer bushing, which adjusts the radial bearing play between the inner bore of he inner bushing and the outer surface of the wicket gate stem;

respective means on the inner and outer bushings which are adjustably spaceable apart axially corresponding to the axial adjustments in position between the outer and inner bushings;

and adjustment means at the means between the outer and inner bushings for holding the axial spacing between the outer and inner bushings at a selected dimension;

wherein the adjustment means comprises a ring that is attached to the inner bushing, that projects radially outwardly and that includes an axially directed surface, and the outer bushing includes a cooperating axially facing surface directed toward the axially facing surface of the inner bushing, and a spacer disposed between those cooperating axially facing surfaces;

wherein the spacer comprises an alignment ring of adjustable thickness; and wherein the adjustably spaceable means on the inner bushing comprises a separate ring and means attaching that separate ring to the inner bushing.

* * * * *